United States Patent
Sreenath et al.

(10) Patent No.: US 9,465,759 B2
(45) Date of Patent: Oct. 11, 2016

(54) UNIVERSAL SERIALIZER ARCHITECTURE

(71) Applicant: Texas Instruments Incorporated, Dallas, TX (US)

(72) Inventors: Somasunder Kattepura Sreenath, Bangalore (IN); Gururaj Kulkarni, Bangalore (IN); Chandan Muddamsetty, Bangalore (IN); Pradeep Kumar Ubbala, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 91 days.

(21) Appl. No.: 14/333,911

(22) Filed: Jul. 17, 2014

(65) Prior Publication Data

US 2016/0019174 A1    Jan. 21, 2016

(51) Int. Cl.
*H04B 1/38* (2015.01)
*G06F 13/28* (2006.01)
*H04B 1/40* (2015.01)
*G06F 13/42* (2006.01)

(52) U.S. Cl.
CPC ......... *G06F 13/287* (2013.01); *G06F 13/4221* (2013.01); *H04B 1/40* (2013.01)

(58) Field of Classification Search
CPC ................ H04L 12/2697; H04L 43/50
USPC ........................................ 375/219
See application file for complete search history.

(56) References Cited

U.S. PATENT DOCUMENTS

2012/0068229 A1\* 3/2012 Bemanian ........... H01L 25/0652
257/209

OTHER PUBLICATIONS

Tsai et al., "A novel MUX-FF circuit for low power and high speed serial link interfaces," in Circuits and Systems (ISCAS), Proceedings of 2010 IEEE International Symposium, May 30, 2010.\*
Tsai et al., "A novel low gate-count serializer topology with Multiplexer-Flip-Flops," in Circuits and Systems (ISCAS), 2012 IEEE International Symposium on, May 20-23, 2012.\*

\* cited by examiner

*Primary Examiner* — David S Huang
(74) *Attorney, Agent, or Firm* — Ronald O. Neerings; Frank D. Cimino

(57) ABSTRACT

Systems and methods for a universal Serializer-Deserializer (SerDes) architecture are described. In various implementations, a transceiver may include: a first plurality of data flip-flops coupled to a data lookup circuit of a SerDes interface; a second plurality of data flip-flops coupled to the data lookup circuit; a plurality of latches, each latch of the plurality of latches coupled to a corresponding data flip-flop of the second plurality of data flip-flops; and a plurality of multiplexers coupled to the plurality of latches, to the first plurality of data flip-flops, and to a transmitter circuit.

18 Claims, 3 Drawing Sheets

UNIVERSAL SERIALIZER ARCHITECTURE

TECHNICAL FIELD

This specification is directed, in general, to electronic communications, and, more specifically, to systems and methods for a universal Serializer-Deserializer (SerDes) architecture.

BACKGROUND

A Serializer-Deserializer (SerDes) is an electronic circuit used in high-speed applications to convert data between serial and parallel interfaces. Typically, a first SerDes interface is implemented at a transmitting device (e.g., a communication device, an interface adaptor, a semiconductor chip, electronic circuit, etc.) and a second SerDes interface is implemented at a receiving device. The SerDes interfaces allow these devices to transmit and receive data serially over a differential line or channel, therefore reducing the number of input/output (I/O) pins or interconnects that would otherwise be required between if a parallel transmission of the same data between the two devices were performed.

There are many different electronic communication standards in use today. For example, USB 3.0 is the third major version of the Universal Serial Bus (USB) standard. Among other features, USB 3.0 adds a transfer mode referred to as "SuperSpeed" (SS), which is capable of transferring data at up to 5 Gbit/s (625 MB/s). The Peripheral Component Interconnect Express (PCIe) is another high-speed communication bus standard that is capable of transferring data at 2 Gbit/s (250 MB/s) to over 15 Gbit/s (~2000 MB/s), depending upon the application. Serial ATA (SATA) is yet another bus interface that connects host bus adapters to mass storage devices, such as hard disk drives and optical drives.

The inventors hereof have recognized that designing a single SerDes to support all standards is a challenge, as the requirements for each standard are different. Designing a circuit with features/blocks designed for each particular standard individually is possible, but it is not feasible in terms of silicon or Printed Circuit Board (PCB) area and design cycle-time. Accordingly, to address these and other concerns, the inventors hereof have developed systems and methods for a universal SerDes transmitter physical layer ("PHY," or layer 1) architecture.

SUMMARY

Systems and methods for a universal Serializer-Deserializer (SerDes) architecture are described. In an illustrative, non-limiting embodiment, a transceiver may include a first plurality of data flip-flops coupled to a data lookup circuit of a SerDes interface; a second plurality of data flip-flops coupled to the data lookup circuit; a plurality of latches, each latch of the plurality of latches coupled to a corresponding data flip-flop of the second plurality of data flip-flops; and a plurality of multiplexers coupled to the plurality of latches, to the first plurality of data flip-flops, and to a transmitter circuit.

The SerDes interface may be configured to operate with two or more different communications standards. For example, the two or more different communications standards include a Universal Serial Bus (USB) standard, a Peripheral Component Interconnect (PCI) standard, or a Serial ATA (SATA) standard.

In some implementations, the first plurality of data flip-flops may include seven data flip-flops, the second plurality of data flip-flops may include another seven data flip-flops, the plurality of latches may include seven latches, and the plurality of multiplexers may include seven multiplexers. A first one of the first plurality of data flip-flops may be configured to receive a first bit of data stored in the data lookup circuit and a first one of the second plurality of data flip-flops may be configured to receive a second bit of data stored in the data lookup circuit in a same clock cycle. The second through seventh ones of the first plurality of data flip-flops may be configured to receive voltage information about the first bit of data, and the second through seventh ones of the second plurality of data flip-flops may be configured to receive voltage information about the second bit of data.

Each flip-flop of the first and second pluralities of flip-flops may have a D input coupled to the data lookup circuit. A first input of a given one of the plurality of multiplexers may be coupled to a Q output of a first one of the first plurality of data flip-flops, a corresponding one of the plurality of latches may be coupled to a Q output of a first one of the second plurality of data flip-flops, a second input of the given one of the plurality of multiplexers may be coupled to an output of the corresponding one of the plurality of latches, and an output of the given one of the plurality of multiplexers may be coupled to an input of the transmitter circuit. Also, each data flip-flop in the first and second pluralities of data flip-flops, each of the plurality of latches, each of the pluralities of multiplexers, and the transmitter circuit may operate based upon a clock signal having half the data rate used by the SerDes interface.

The transceiver may further include a set/reset generation circuit coupled to a given data flip-flop of the first or second pluralities of data flip-flops, the set/reset generation circuit configured to provide low frequency periodic signaling (LFPS) and beacon signaling. The set/reset generation circuit may include a delay circuit configured to receive LFPS data; a first inverter configured to receive the LFPS data; a second inverter configured to receive an output of the delay circuit; a first OR gate configured to receive an output of the first inverter and the output of the delay circuit; a second OR gate configured to receive an output of the second inverter and the LFPS data; a first multiplexer configured to receive a logic high and the output of the first OR gate, wherein an output of the first multiplexer is coupled to a set input of the given data flip-flop; and a second multiplexer configured to receive a logic high and an output of the second OR gate, wherein an output of the second multiplexer is coupled to a reset input of the given data flip-flop.

The transceiver may further include a SATA idle generation circuit coupled to a set input and to a reset input of a given data flip-flop of the first or second pluralities of data flip-flops, the SATA idle generation circuit configured to provide termination with a selected common-mode voltage.

In another illustrative, non-limiting embodiment, a SerDes interface may be configured to operate in accordance with two or more communications standards, the SerDes interface comprising: a first plurality of data flip-flops coupled to a data lookup circuit; a second plurality of data flip-flops coupled to the data lookup circuit; a plurality of latches, each latch of the plurality of latches coupled to a corresponding data flip-flop of the second plurality of data flip-flops; and a plurality of multiplexers coupled to the plurality of latches, to the first plurality of data flip-flops, and to a transmitter circuit, wherein the two or more different communications standards include a USB)standard, a PCI standard, or a SATA standard, and wherein each of the data flip-flops, latches, multiplexers, and the transmitter circuit operates based upon a clock signal having half the data rate of a selected one of the communication standards.

In yet another illustrative, non-limiting embodiment, a communication device may have a SerDes circuit, the SerDes circuit comprising a first plurality of flip-flops; a second plurality of flip-flops, wherein each flip-flop of the first and second pluralities of flip-flops has a D input coupled to a data lookup circuit; a plurality of latches, each latch coupled to a corresponding flip-flop of the second plurality of flip-flops; and a plurality of multiplexers, wherein a first input of a given one of the plurality of multiplexers is coupled to a Q output of a first one of the first plurality of data flip-flops, wherein a second input of the given one of the plurality of multiplexers is coupled to a Q output of a first one of the second plurality of data flip-flops via a corresponding one of the plurality of latches, and wherein an output of the given one of the plurality of multiplexers is coupled to an input of a transmitter circuit, and wherein the SerDes interface operates based upon a clock signal having half the data rate of a selected one of two or more communication standards.

In some embodiments, one or more electronic circuits, communications devices, or computer systems may perform one or more of the techniques described herein. In other embodiments, an electronic circuit may implement a physical layer (PHY) transceiver or chip that may be used, for example, in electronic devices, computer systems, and/or mobile and consumer applications such as smartphones, tablets, digital TVs, and networking In yet other embodiments, a device may include at least one processor or controller and a memory. Examples of a processor or controller include, but are not limited to, a digital signal processor (DSP), an application specific integrated circuit (ASIC), a system-on-chip (SoC) circuit, a field-programmable gate array (FPGA), a microprocessor, or a microcontroller.

BRIEF DESCRIPTION OF THE DRAWINGS

Figure 1:
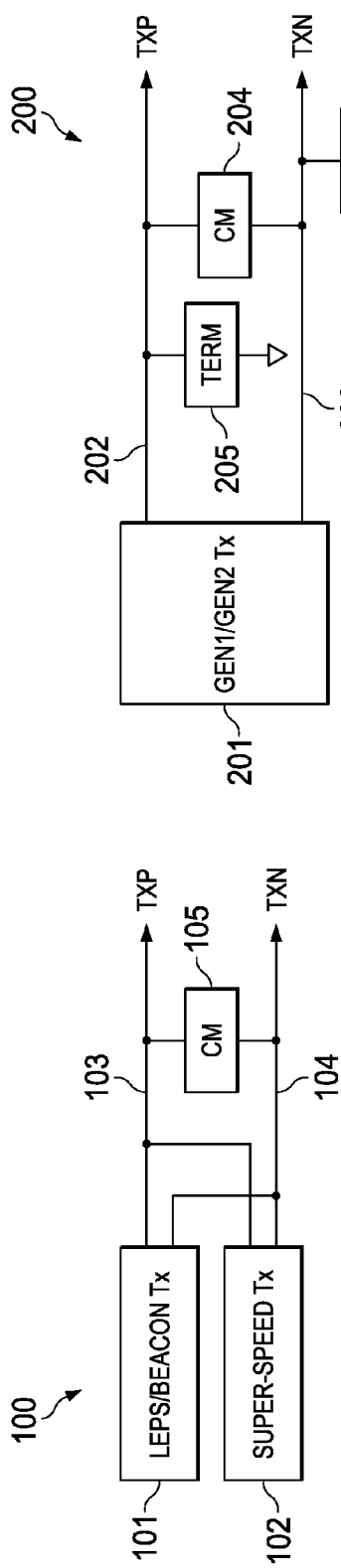
Figure 2:
Figure 3:
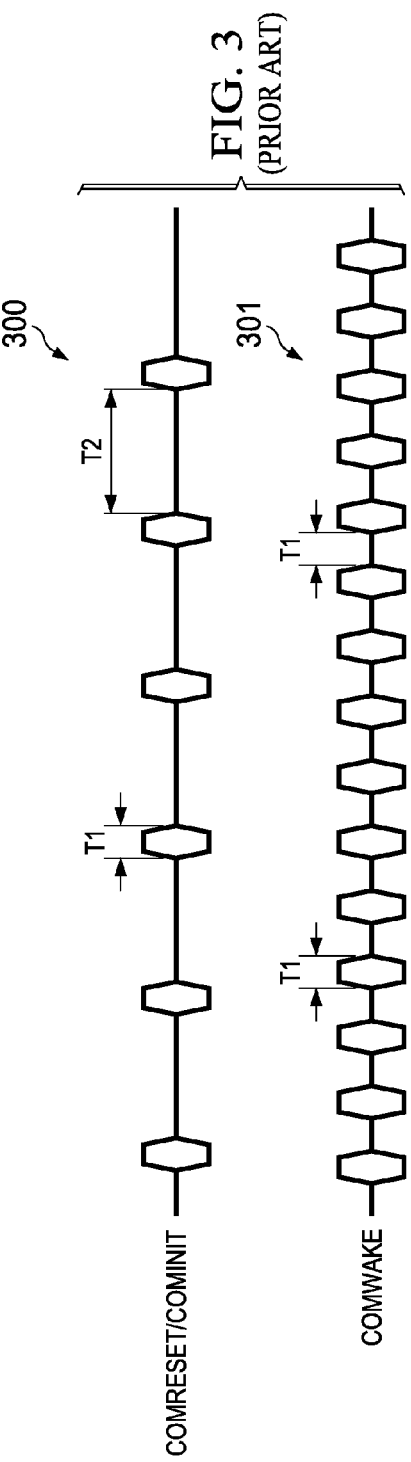

Having thus described the invention(s) in general terms, reference will now be made to the accompanying drawings, wherein:

FIGS. 1-3 are diagrams of prior art SerDes transmitter PHY layer architectures designed for individual communication protocols and aspects thereof.

Figure 4:
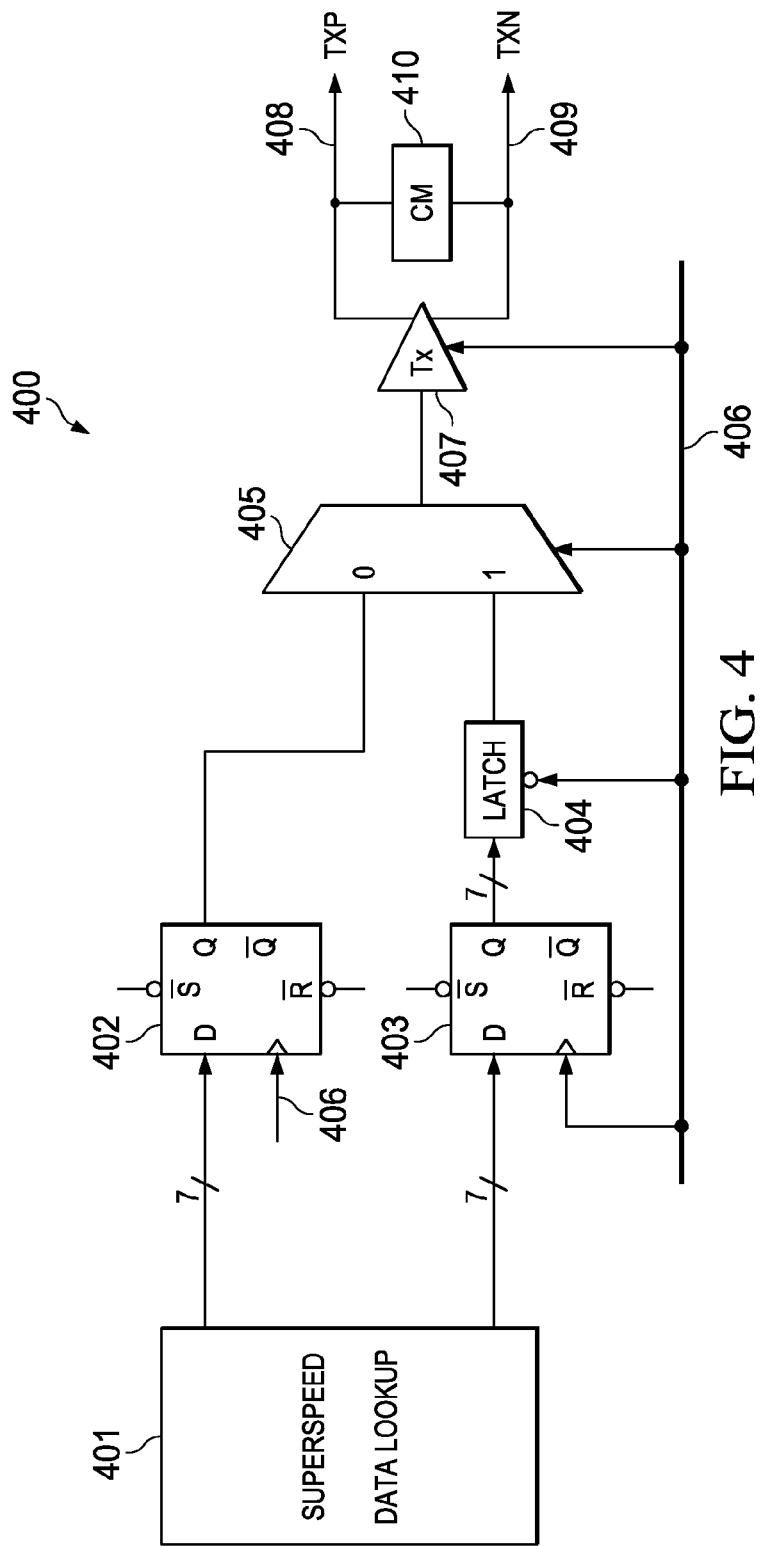

FIG. 4 is a block diagram of an implementation of a universal SerDes transmitter interface according to some embodiments.

Figure 5:
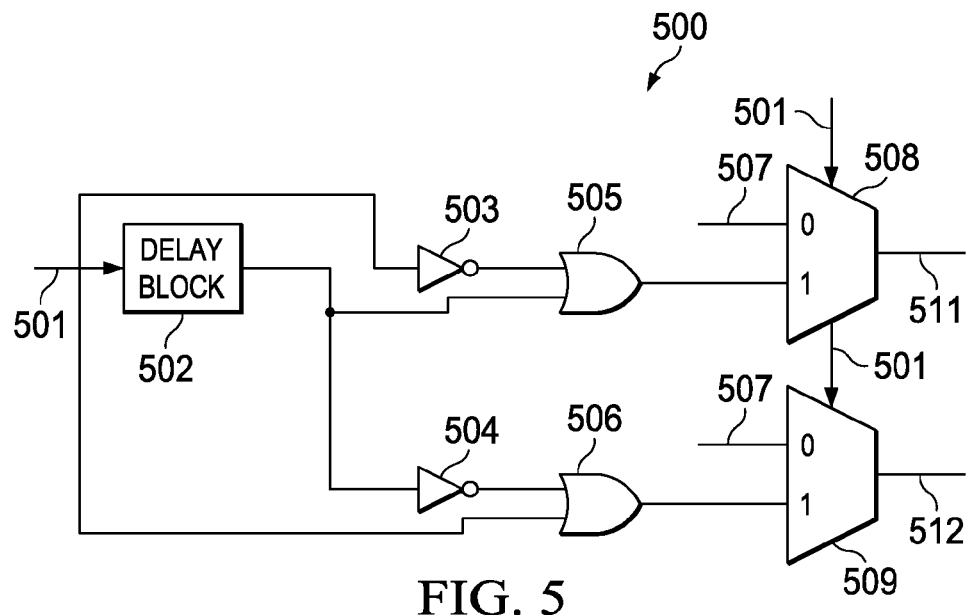

FIG. 5 is a diagram of a Low-Frequency-Periodic Signaling (LFPS)/Beacon Set/Reset Generation logic according to some embodiments.

Figure 6:
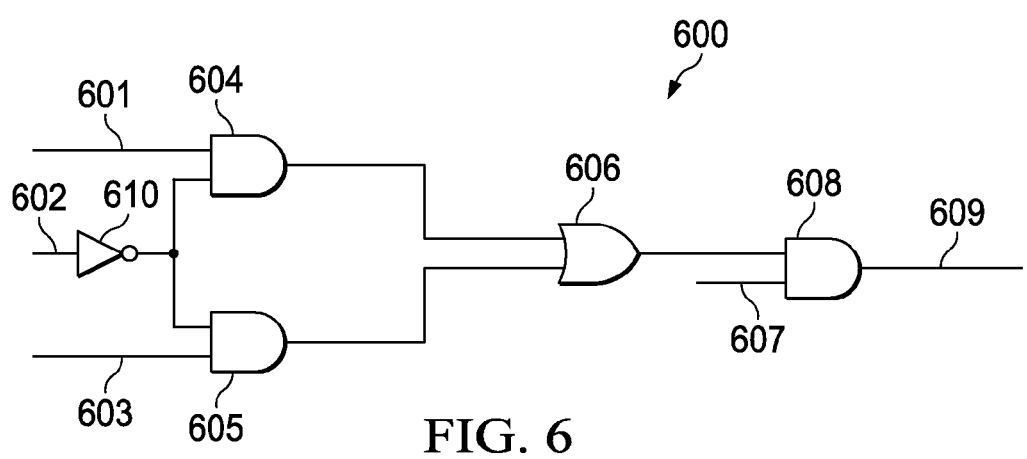

FIG. 6 is a diagram of a SATA IDLE implementation logic according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In some embodiments, a universal SerDes architecture such as described herein may be designed to satisfy various requirements of different communication buses with efficient re-use of circuitry to achieve a desired functionality with smaller silicon and/or PCB area, and reduced cycle-time. In some cases, aggressive power management may be possible, at least in part, due to an isolation implementation on the high-speed data path so that most of the digital logic and higher layer logic may be powered down. Generally speaking, this architecture may be implemented, for example wherever there is a requirement for both high-speed data transmission and low-speed data transfers. Moreover, a single SerDes interface, when designed using the techniques described herein, may be capable of fully supporting multiple standards.

FIGS. 1-3 are diagrams of prior art SerDes transmitter PHY layer architectures designed for individual communication protocols and aspects thereof. Particularly, FIG. 1 shows USB 3.0 SerDes 100 including Low Frequency Periodic (LFPS) circuit 101 configured to generate bursts of various durations used for basic link signaling. Generally speaking, LFPS may be used for waking up a sleeping link, requesting diagnostic test modes or power saving/sleep modes, warm reset, etc. Distinct from LFPS circuit 101, SuperSpeed transmitter circuit 102 is configured to transmit data at up to the highest rates permitted under the USB 3.0 protocol. The data is transmitted over the differential channels TXP 103 and TXN 104, with common mode circuit 105 coupled between those channels and configured to maintain common-mode (CM) in IDLE condition, which is required by the USB 3.0 standard.

Still referring to FIG. 1, an architecture similar to that of USB 3.0 SerDes 100 may be used to support a PCIe standard, but with different design requirements. For example, in a PCIe implementation, LFPS circuit 101 may be replaced with a beacon circuit configured to generate beacon signals, and SuperSpeed transmitter circuit 102 may be replaced with a PCIe transmitter circuit, each of which is particular to the PCIe standard.

FIG. 2 shows a prior art SATA transmitter implementation. SATA SerDes 200 includes first and/or second and/or third generation SATA transmitter block 201 configured to output differential signal TXP 202 and TXN 203, with common mode circuit 204 coupled between those channels. Because the SATA protocol requires a termination enabled in IDLE state, termination circuits 205 and 206 are also provided.

As an aspect of the SATA protocol, Out-of-Band Signaling (OOBS) includes periods of data transmission and IDLE lines. Specifically, information regarding the type of OOBS signaling is encoded in the IDLE, transmission burst times of FIG. 3, with signal 300 encoding communication reset and/or initialization information using periods T1 and T2, and signal 301 encoding communication wake information using period T1.

Thus, as illustrated in FIGS. 1-3, each different communication standard has traditionally required a different SerDes implementation to satisfy its various requirements. In contrast with the foregoing, embodiments described herein include a universal SerDes architecture capable of satisfying the requirements of two or more communication standards (e.g., USB 3.0, PCIe, and SATA) simultaneously.

FIG. 4 is a block diagram of an implementation of universal SerDes transmitter interface 400. In some embodiments, as explained in more detail below, SerDes interface 400 may work with a phase-locked loop (PLL) clock at half of the data-rate (e.g., 2.5 GHz clock for 5 Gbps data-rate), such that two bits of data are handed off from the digital domain to the analog transmitter in one clock cycle. Interface 400 may use the set and/or reset inputs of certain data flip-flops to drive LFPS/Beacon signaling, thus reusing logic and other transmitter circuitry for super-speed and LFPS/Beacon transmission. Digital-to-analog conversion may involve using one bit of data and a 6-bit swing setting to achieve the various swing/de-emphasis settings required for PCIE/USB3.0 standards. In some cases, interface 400 may effectively enable the transmission of high speed and low speed signaling without a multiplexer (mux) added in the data-path, as the addition of a mux may make timing closure of half-cycle path between digital and analog more difficult.

As illustrated, SuperSpeed/data lookup circuit 401 is coupled to a first plurality of data flip-flops, a given one of which is indicated as flip-flop 402, and to a second plurality of flip-flops, a given one of which is indicated as flip-flop 403. The second plurality of flip-flops is coupled to a plurality of latches, one of which is indicated as latch 404. The first plurality of flip-flops and the plurality of latches are coupled to a plurality of multiplexers, one of which is indicated as multiplexer 405. The plurality of multiplexers is coupled to transmitter circuit 407, which is configured to output differential signal pair TXP 408 and TXN 409, which in turn are coupled by common mode circuit 410.

In some embodiments, the first plurality of data flip-flops may include seven data flip-flops, the second plurality of data flip-flops may include seven data flip-flops, the plurality of latches may include seven latches, and the plurality of multiplexers may include seven multiplexers. As a person of ordinary skill in the art will understand in light of this disclosure, however, one or more of these plurality of may be implemented as a single (or fewer) circuits having the functionality (e.g., number of inputs and outputs) of the plurality.

Flip-flop 402 may be configured to receive a first bit of data stored in data lookup circuit 401 and flip-flop 403 may be configured to receive a second bit of data stored in data lookup circuit 401 in a same clock cycle. The second through seventh ones of the first plurality of flip-flops (not shown) may be configured to receive swing and/or de-emphasis settings (e.g., voltage information) of the first bit of data, and the second through seventh ones of the second plurality of flip-flops (not shown) may be configured to receive swing and/or de-emphasis settings (e.g., voltage information) of the second bit of data.

Flip-flops 402 and 403 have their D inputs coupled to data lookup circuit 401. A first input of multiplexer 405 is coupled to the Q output of flip-flop 402. Latch 404 is coupled to the Q output of flip-flop 403. A second input of multiplexer 405 is coupled to the output of latch 404. Also, the output of multiplexer 405 is coupled to the input of transmitter circuit 407. In some implementations, transmitter circuit 407 may include seven resistor elements that may be connected to ground, reference or common-mode during its operation; and such that each one of the plurality of multiplexers to which multiplexer 405 belongs has its output coupled to a corresponding one of the seven resistor elements.

In some implementations, elements 402-405 and 407 may be configured to operate with phase-locked loop (PLL) clock signal 406 at half of the data-rate of SerDes interface 400. Furthermore, SerDes interface 400 may be configured to operate with two or more different communications standards including, for example, the Universal Serial Bus (USB) standard and variations thereof, the Peripheral Component Interconnect Express (PCIe) standard and variations thereof, or a Serial ATA (SATA) standard and variations thereof In some embodiments, LFPS (for USB 3.0 transmissions) and beacon signaling (for PCIe transmissions) may be performed by manipulating the $\overline{S}$ and $\overline{R}$ inputs of flip-flops 402 and 403 (as well as corresponding inputs of other flip-flops in the first and second pluralities of flip-flops). To illustrate this, FIG. 5 is a diagram of a Low-Frequency-Periodic Signaling (LFPS)/Beacon Set/Reset Generation logic circuit 500. In some embodiments, in order to have full control over the swing, the LFPS data for (7-bits/data) may be generated based on a look-up table. Moreover circuit 500 may be configured to meet USB 3.0 LFPS' requirement of full-swing differential voltage of 1 V on TXP 408 and TXN 409, as well as PCIe's beacon signaling requirement of −6 dB signaling on TXP 408 and TXN 409 (e.g., for a differential signal of 0.5 V). This may be achieved, for instance, by using a programmable swing setting combined with LFPS data with appropriate polarity in circuit 500.

Specifically, circuit 500 may include delay circuit 502 configured to receive LFPS data/Beacon 501 and first inverter 503 also configured to receive LFPS data/Beacon 501. Second inverter 504 may be configured to receive an output of delay circuit 502. First OR gate 505 may be configured to receive an output of first inverter 503 and the output of delay circuit 502. Second OR gate may be configured to receive an output of second inverter 504 and LFPS data 501. First multiplexer 508 may be configured to receive logic high signal 507 (i.e., a logic "1") and the output of first OR gate 505 at its inputs, and an output of first multiplexer 508 may be coupled to the $\overline{S}$ input of flip-flops 402 and 403. Second multiplexer 509 may be configured to receive logic high signal 507 and the output of second OR gate 506 at its inputs, and an output of first multiplexer 509 may be coupled to the $\overline{R}$ input of flip-flops 402 and 403. The second inputs of multiplexers 508 and 509 are selected upon application of LFPS data signal 501.

The USB 3.0 standard puts a maximum timing constraint of 20 ns for LFPS transmissions turning off to SuperSpeed transmissions turning on. This requirement may be met, for example, by making the SuperSpeed data path and LFPS Set/Reset path asynchronous. On the other hand, the SATA IDLE requirement (during OOBS and in other IDLE states) is that there be a termination and/or a common-mode voltage on the lines. This is achieved by controlling the SATA IDLE with the appropriate 7-bit code to get TXP/TXN lines to common-mode voltage and as a property the parallel combination gives 50 Ohms termination. In addition, to provide aggressive power management, a controller may be put in retention and most of the PHY logic powered down. In the low power modes, if the line needs to be maintained IDLE, an isolation latch may help in retaining the 7-bit code so that the TXP/TXN may be kept at CM with termination.

To address the foregoing requirements, FIG. 6 is a diagram of SATA IDLE implementation logic circuit 600. In some embodiments, circuit 600 may have its output sata_idle signal 609 coupled to the $\overline{S}$ and/or $\overline{R}$ inputs of flip-flops 402 and 403 (as well as corresponding inputs of other flip-flops in the first and second pluralities of flip-flops), thus providing an isolation latch, and it may be configured to provide termination with a selected common-mode voltage. This scheme ensures the IDLE state static code on the data through the Set/Reset of flip-flops 402 and 403. This approach enables TXP 408 and TXN 409 to have common-mode with termination. As a result, circuit 600 does not use separate termination for SATA IDLE mode implementation, but instead uses the $\overline{S}$ and/or $\overline{R}$ inputs of flip-flops 402 and 403 to control the driver swing setting to achieve the termination with common-mode voltage (e.g., 0.5 V). In addition, in the low power states, the 7-bit Set/Reset can be stored using an ISOLATION latch to enable maintaining IDLE state with termination on the lines with most digital power-down and limited analog circuitry powered-up.

Particularly, signal 601 is configured to enable an IDLE state, signal 602 is offset from signal 601 by two clock cycles, and signal 603 is configured to enable data transmission. Signal 601 is coupled to a first input of AND gate 604. Signal 602 is coupled to an input of inverter 610, and the output of inverter 610 is coupled to a second input of AND gate 604 and to a first input of AND gate 605. Signal 603 is coupled to the second input of AND gate 605.

The outputs of AND gates 604 and 605 are coupled to the inputs of OR gate 606. The output of OR gate 606 is coupled to a first input of AND gate 608, and signal 607, which indicates the SATA mode, is coupled to the second input of AND gate 608. The output of AND gate 609 provides sata_idle signal 609, which is coupled to the $\overline{S}$ and/or $\overline{R}$ inputs of flip-flops 402 and 403.

It will be understood that various operations discussed herein may be executed simultaneously and/or sequentially. It will be further understood that each operation may be performed in any order and may be performed once or repetitiously. In various embodiments, the operations discussed herein may represent sets of logic functions and/or data structures that are configured to perform specified operations. Although certain circuits and/or operations may be shown as distinct logical blocks, in some embodiments at least some of these circuits and/or operations may be combined into fewer blocks. Conversely, any given one of the blocks shown herein may be implemented such that its circuits and/or operations may be divided among two or more logical blocks. Moreover, although shown with a particular configuration, in other embodiments these various blocks may be rearranged in other suitable ways.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A transceiver, comprising:
  a first plurality of data flip-flops coupled to a data lookup circuit of a Serializer-Deserializer (SerDes) interface, wherein, during a clock cycle, a first one of the first plurality of data flip-flops is configured to receive a first bit of data stored in the data lookup circuit, and wherein the remaining ones of the first plurality of data flip-flops are configured to receive voltage information about the first bit of data;
  a second plurality of data flip-flops coupled to the data lookup circuit, wherein, during the clock cycle, a first one of the second plurality of data flip-flops is configured to receive a second bit of data stored in the data lookup circuit, and wherein the remaining ones of the second plurality of data flip-flops are configured to receive voltage information about the second bit of data;
  a plurality of latches, each latch of the plurality of latches coupled to a corresponding data flip-flop of the second plurality of data flip-flops; and
  a plurality of multiplexers coupled to the plurality of latches, to the first plurality of data flip-flops, and to a transmitter circuit.

2. The transceiver of claim 1, wherein the SerDes interface is configured to operate with two or more different communications standards.

3. The transceiver of claim 2, wherein the two or more different communications standards include a Universal Serial Bus (USB) standard.

4. The transceiver of claim 1, wherein the first plurality of data flip-flops includes seven data flip-flops, wherein the second plurality of data flip-flops includes another seven data flip-flops, wherein the plurality of latches includes seven latches, and wherein the plurality of multiplexers includes seven multiplexers.

5. The transceiver of claim 1, wherein each flip-flop of the first and second pluralities of flip-flops has a D input coupled to the data lookup circuit.

6. The transceiver of claim 1, wherein a first input of a given one of the plurality of multiplexers is coupled to a Q output of a first one of the first plurality of data flip-flops, wherein a corresponding one of the plurality of latches is coupled to a Q output of a first one of the second plurality of data flip-flops, wherein a second input of the given one of the plurality of multiplexers is coupled to an output of the corresponding one of the plurality of latches, and wherein an output of the given one of the plurality of multiplexers is coupled to an input of the transmitter circuit.

7. The transceiver of claim 1, wherein each data flip-flop in the first and second pluralities of data flip-flops, each of the plurality of latches, each of the pluralities of multiplexers, and the transmitter circuit operate based upon a clock signal having half the data rate used by the SerDes interface.

8. The transceiver of claim 1, further comprising a set/reset generation circuit coupled to a given data flip-flop of the first or second pluralities of data flip-flops, the set/reset generation circuit configured to provide low frequency periodic signaling (LFPS) and beacon signaling.

9. The transceiver of claim 8, the set/reset generation circuit further comprising:
  a delay circuit configured to receive LFPS data;
  a first inverter configured to receive the LFPS data;
  a second inverter configured to receive an output of the delay circuit;
  a first OR gate configured to receive an output of the first inverter and the output of the delay circuit;
  a second OR gate configured to receive an output of the second inverter and the LFPS data;
  a first multiplexer configured to receive a logic high and the output of the first OR gate, wherein an output of the first multiplexer is coupled to a set input of the given data flip-flop; and
  a second multiplexer configured to receive a logic high and an output of the second OR gate, wherein an output of the second multiplexer is coupled to a reset input of the given data flip-flop.

10. A transceiver, comprising:
  a first plurality of data flip-flops coupled to a data lookup circuit of a Serializer-Deserializer (SerDes) interface;
  a second plurality of data flip-flops coupled to the data lookup circuit;
  a plurality of latches, each latch of the plurality of latches coupled to a corresponding data flip-flop of the second plurality of data flip-flops;

a plurality of multiplexers coupled to the plurality of latches, to the first plurality of data flip-flops, and to a transmitter circuit; and a Serial ATA (SATA) idle generation circuit coupled to a set input and to a reset input of a given data flip-flop of the first or second pluralities of data flip-flops, the SATA idle generation circuit configured to provide termination with a selected common-mode voltage.

11. A Serializer-Deserializer (SerDes) interface configured to operate in accordance with two or more communications standards, the SerDes interface comprising:

a first plurality of data flip-flops coupled to a data lookup circuit;

a second plurality of data flip-flops coupled to the data lookup circuit;

a plurality of latches, each latch of the plurality of latches coupled to a corresponding data flip-flop of the second plurality of data flip-flops;

a plurality of multiplexers coupled to the plurality of latches, to the first plurality of data flip-flops, and to a transmitter circuit, wherein each of the data flip-flops, latches, multiplexers, and the transmitter circuit operates based upon a clock signal having half the data rate of a selected one of the communication standards; and a set/reset generation circuit coupled to a given data flip-flop of the first or second pluralities of data flip-flops, the set/reset generation circuit configured to provide low frequency periodic signaling (LFPS) and beacon signaling.

12. The SerDes interface of claim 11, wherein the first plurality of data flip-flops includes seven data flip-flops, wherein the second plurality of data flip-flops includes another seven data flip-flops, wherein the plurality of latches includes seven latches, and wherein the plurality of multiplexers includes seven multiplexers.

13. The SerDes interface of claim 11, wherein a first one of the first plurality of data flip-flops is configured to receive a first bit of data stored in the data lookup circuit and a first one of the second plurality of data flip-flops is configured to receive a second bit of data stored in the data lookup circuit in a same clock cycle, wherein the second through seventh ones of the first plurality of data flip-flops are configured to receive voltage information about the first bit of data, and wherein the second through seventh ones of the second plurality of data flip-flops are configured to receive voltage information about the second bit of data.

14. The SerDes interface of claim 11, wherein each flip-flop of the first and second pluralities of data flip-flops has a D input coupled to the data lookup circuit, wherein a first input of a given one of the plurality of multiplexers is coupled to a Q output of a first one of the first plurality of data flip-flops, wherein a corresponding one of the plurality of latches is coupled to a Q output of a first one of the second plurality of data flip-flops, wherein a second input of the given one of the plurality of multiplexers is coupled to an output of the corresponding one of the plurality of latches, and wherein an output of the given one of the plurality of multiplexers is coupled to an input of the transmitter circuit.

15. The SerDes interface of claim 11, further comprising:

a Serial ATA (SATA) idle generation circuit coupled to a set input and to a reset input of a given data flip-flop of the first or second pluralities of data flip-flops, the SATA idle generation circuit configured to provide termination with a selected common-mode voltage.

16. A communication device having a Serializer-Deserializer (SerDes) circuit, the SerDes circuit comprising:

a first plurality of flip-flops, wherein, during a clock cycle, a first one of the first plurality of data flip-flops is configured to receive a first bit of data stored in the data lookup circuit, and wherein other ones of the first plurality of data flip-flops are configured to receive voltage information about the first bit of data;

a second plurality of flip-flops, wherein each flip-flop of the first and second pluralities of flip-flops has a D input coupled to a data lookup circuit, wherein, during the clock cycle, a first one of the second plurality of data flip-flops is configured to receive a second bit of data stored in the data lookup circuit in a same clock cycle, and wherein other ones of the second plurality of data flip-flops are configured to receive voltage information about the second bit of data;

a plurality of latches, each latch coupled to a corresponding flip-flop of the second plurality of flip-flops; and a plurality of multiplexers, wherein a first input of a given one of the plurality of multiplexers is coupled to a Q output of a first one of the first plurality of data flip-flops, wherein a second input of the given one of the plurality of multiplexers is coupled to a Q output of a first one of the second plurality of data flip-flops via a corresponding one of the plurality of latches, and wherein an output of the given one of the plurality of multiplexers is coupled to an input of a transmitter circuit, and wherein the SerDes interface operates based upon a clock signal having half the data rate of a selected one of two or more communication standards.

17. The communication device of claim 16, wherein the SerDes circuit is configured to operate with two or more different communications standards.

18. The communication device of claim 16, wherein the first plurality of data flip-flops includes seven data flip-flops, wherein the second plurality of data flip-flops includes another seven data flip-flops, wherein the plurality of latches includes seven latches, and wherein the plurality of multiplexers includes seven multiplexers.

* * * * *